(12) United States Patent
Kilian

(10) Patent No.: US 7,580,810 B2
(45) Date of Patent: Aug. 25, 2009

(54) METHOD FOR DETERMINING A MEASURING POINT IN TIME FOR A FIELD DEVICE AND CORRESPONDING FIELD DEVICE IN WHICH A MEASURING POINT IN TIME HAS BEEN DETERMINED

(75) Inventor: Markus Kilian, Feiburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 110 days.

(21) Appl. No.: 10/550,695

(22) PCT Filed: Mar. 31, 2004

(86) PCT No.: PCT/EP2004/003408

§ 371 (c)(1),
(2), (4) Date: Dec. 22, 2006

(87) PCT Pub. No.: WO2004/088441

PCT Pub. Date: Oct. 14, 2004

(65) Prior Publication Data

US 2007/0136011 A1    Jun. 14, 2007

(30) Foreign Application Priority Data

Apr. 2, 2003    (DE) ................................ 103 15 164

(51) Int. Cl.
*H04B 17/00* (2006.01)
*G06F 17/40* (2006.01)

(52) U.S. Cl. .................. 702/178; 702/127; 702/176; 702/187; 700/306

(58) Field of Classification Search ................ 702/178, 702/125, 127, 176, 177, 187
See application file for complete search history.

(56) References Cited

U.S. PATENT DOCUMENTS

| 2002/0004370 | A1* | 1/2002 | Stengele et al. ............... 455/39 |
| 2003/0083756 | A1* | 5/2003 | Hsiung et al. .................. 700/28 |
| 2004/0168837 | A1* | 9/2004 | Michaud et al. ............ 180/9.46 |
| 2004/0255017 | A1* | 12/2004 | Jurisch et al. ............... 709/223 |
| 2005/0021705 | A1* | 1/2005 | Jurisch ....................... 709/223 |
| 2005/0071113 | A1* | 3/2005 | Heilig ......................... 702/127 |
| 2006/0075085 | A1* | 4/2006 | Borg ........................... 709/224 |
| 2006/0101111 | A1* | 5/2006 | Bouse et al. ................. 709/200 |
| 2008/0101420 | A1* | 5/2008 | Nichols ....................... 370/522 |

* cited by examiner

*Primary Examiner*—Hal D Wachsman
(74) *Attorney, Agent, or Firm*—Bacon & Thomas, PLLC

(57) ABSTRACT

A method and apparatus for determining a measuring point in time ($t_M$), at which a measured value is to be produced by a field device of process automation technology, wherein the field device communicates its measured values at certain communication points in time ($t_K$) over a field bus following a query from a central control unit with regard to the measured values of the field device. The communication point in time ($t_f$) is approximated from at least two communication points in time ($t_K$, $t'_K$) and the measuring point in time ($t_M$) is determined on the basis of the approximated communication point in time ($t_f$).

4 Claims, 2 Drawing Sheets

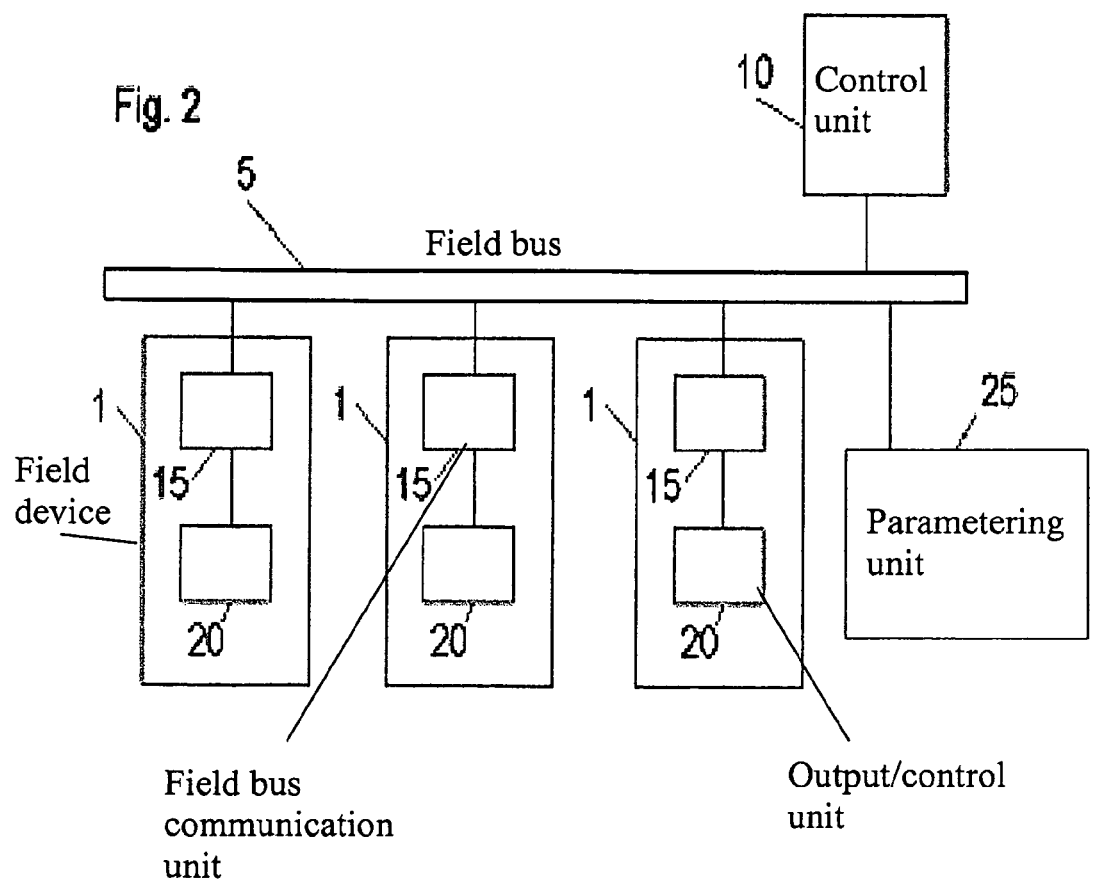

METHOD FOR DETERMINING A MEASURING POINT IN TIME FOR A FIELD DEVICE AND CORRESPONDING FIELD DEVICE IN WHICH A MEASURING POINT IN TIME HAS BEEN DETERMINED

The present application is a national stage application of PCT application No. PCT/EP2004/003408, which is based on European application, EPO 103 15 164.8.

FIELD OF THE INVENTION

The invention relates to a method for determining a measuring point in time ($t_M$), at which a measured value is to be produced by a field device of process automation technology, wherein the field device communicates its measured values at certain communication points in time ($t_K$) over a field bus, following a query from a central control unit for its measured values. Additionally, the invention relates to a corresponding apparatus. The field device is, for example, a fill level measuring device. The measured values are, for example, fill level, pressure, viscosity, density or a pH-value of a medium. The field bus is, for example, a Profibus" field bus.

BACKGROUND OF THE INVENTION

Field-devices/measuring devices e.g. for measuring and/or monitoring the fill level of a medium in a container are produced and sold by the assignee. These measuring devices deliver their measured values, or, in general, the chemical or physical process variables, usually on a field bus for further processing. Desirably, the measurement data are as current as possible, so that they reflect the current state of the medium. This is, above all, relevant, when the frequency of the fetches or queries lies in the order of magnitude of the possible measuring frequency. Consequently, the measured data should be produced just shortly before the communication. For this, however, it must be known, when the query will occur through the field bus. This point in time depends e.g. on how many measuring devices are connected to the field bus. If the number of measuring devices is increased, then the time spacing between the queries becomes greater. Also, the configuration of the whole system can be changed, so that the spacings vary. Thus, there are no rigidly predetermined time spacings. This problem arises especially, when the query comes over the field bus from a central control unit and when the field devices do not communicate their data independently or at least do not know about the remaining happenings on and around the field bus. If the queries occur in sufficiently large time spacings that, in the meantime, plural measurements are possible, then it can be desirable to reduce energy consumption by avoiding the taking of measurements which will not be fetched anyway.

SUMMARY OF THE INVENTION

An object of the invention is to determine approximately the point in time of a query from the central control unit, in order to coordinate therewith the production of the measured value therefor. For such purpose, a method and a corresponding apparatus are required.

The object is achieved according to the invention with reference to the method by the following features: That, on the basis of at least two communication points in time ($t_K$, $t'_K$) the following communication point in time ($t_f$) is at least approximately determined, and that, on the basis of the approximately determined communication point in time ($t_f$), the point in time ($t_M$) of measurement is determined. The point in time of measurement ($t_M$) should, in such case, lie as shortly as possible before the approximately determined communication point in time ($t_f$) and, consequently, before the reporting of the measured value. Thus, from previous communication points in time, future queries are inferred, e.g. by averaging of the previous points in time. The method thus assumes that queries have already taken place; the method thus cannot be applied e.g. for the start-up of a system. Advantageous for the method is, following possibly every communication, to estimate the following communication point in time ($t_f$) using the directly preceding communication point in time ($t_K$). If, for example, the number of measuring devices changes, or if something in the total configuration changes, then the spacing between queries will also change. The measuring point in time ($t_M$) must, in such case, be so determined, that the spacing to the communication point in time ($t_f$) is as small as possible. The measuring point in time ($t_M$) should, however, also be so placed, that the measured value can also actually be communicated. Thus, when it is known, that the production of a measured value can take different lengths of time, then this is to be considered.

An advantageous embodiment provides that the measurement point in time ($t_M$) is also communicated with the measured value. This is important in the evaluation of a time series, in order to be able to associate the measured values with the points in time at which they were determined. The communication of the measurement point in time ($t_M$) is, above all, important, when the measurement points in time have varying time spacings. Thus, this communication enables also a time evaluation of the measured values.

An embodiment provides that, from at least one time span (A) between at least two preceding communication points in time ($t_K$, $t'_K$) and a preceding communication point in time ($t''_K$), the following communication point in time ($t_f$) is approximated. Thus, first it is calculated, that e.g. between two preceding queries there was a time difference of x seconds, i.e. $A=|t'_K-t_K|=x$ seconds. In line with this, the following communication point in time ($t_f$) is the point in time ($t''_K$) of the directly preceding query, plus x seconds. In such case, a point in time ($t_K$, $t'_K$) can be identical with the point in time ($t''_K$), starting from which the following communication point in time ($t_f$) is approximated, i.e. $t'_K=t''_K$. A further possibility is to determine the time span (A) between three queries. For approximating the following communication point in time ($t_f$), this spacing (A) can either be added to the point in time of the next to last query or the spacing (A) is divided by 2 and added to the point in time of the directly preceding query ($t''_K$). Other variants of forming the average value are possible. For instance, also only one time span can be used for approximating the next following communication point in time ($t_f$).

An advantageous embodiment provides that at least two time spans ($A_1$, $A_2$) between, in each case, at least two preceding communication points in time ($t_{K1}$, $t'_{K1}$, $t_{K2}$, $t'_{K2}$) are calculated, that an average value (M) is formed from the time spans ($A_1$, $A_2$), and that the following communication point in time ($t_f$) is approximated starting from the average value (M) and a preceding communication point in time ($t''_K$). At a minimum, thus, three queries—i.e., for example, $t'_{K1}=t_{K2}$—must have taken place, so that between, in each case, two queries, the time spans ($A_1$, $A_2$) can be determined and the average value (M) can be formed. By the forming of averages, the advantage is obtained, that smaller fluctuations of the time spans drop out. In such case, an optimum can be found for the number of values used for forming the average value.

An advantageous embodiment provides that, in the case where the time span ($A_b$) until an approximately determined communication point in time ($t_f$) is smaller than a smallest value (K), the communication point in time ($t_f$) is approximated starting from this smallest value (K), with the smallest value (K) being determined from the minimum time span ($A_{min}$) possible between two measurements one following on the other, when technical constraints are taken into consideration. The case can arise that the queries come too quickly for the field device. In such case, the technical constraints of the field device must be addressed. The measuring rate can thus not be predetermined by the central control unit, but must, instead, be set by the field device itself.

An advantageous embodiment provides that, in the case where the time span ($A_b$) to the approximated communication point in time ($t_f$) is greater than a limit value (G), the communication point in time ($t_f$) is approximated starting from the time span ($A'_b$), which was used for the approximation of the preceding approximated communication point in time ($t_f$), wherein the limit value (G) represents a boundary between a time span between queries in a normal communication cycle and a time span in a disturbed communication cycle of the control unit. Thus, a problem is that e.g. in the case of field/measuring devices, a parametering can be performed, i.e. parameters are newly set by a parametering unit. Such a process takes, for the most part, markedly longer than the spacing between normal queries by the central control unit. If such a parametering is performed on a measuring device, then, in the case of a field device that follows the measuring device in the query sequence, the query first arrives markedly later. Such an intervention can not be predicted, but must be taken out of the calculation of the following communication point in time ($t_f$), since it is not to be expected that, right after one parametering procedure, another will follow. Thus to be distinguished is between a normal communication cycle and a communication cycle disturbed e.g. by a parametering. Therefore, if, from the calculations, a time span ($A_b$) results, which is greater than a limit value (G), then there has entered into the calculation a time span, which has possibly resulted from a parametering or other disturbance of the normal communication cycle. Therefore, calculations should not use this spacing ($A_b$), since a point in time would result, which would, with high probability, lie after the real query. In the simplest implementation, the time span ($A'_b$) of the preceding approximation is used for the approximation of the next point in time. However, an arbitrarily determined, standard value can also be used. Usually, the points in time for queries and for parametering differ sufficiently, such that e.g. a statistical evaluation of a multiplicity of time spans between queries yields a limit value (G). This should be performed in an installation on site or by a simulation of the system. Another implementation of this recognizing of a disturbance of the communication cycle is to evaluate the deviation between the calculated and the arisen communication point in time and, in the case of a deviation, which is, in turn, greater than a value to be determined, to modify the approximation suitable for the next communication point in time.

The object is also achieved with respect to an apparatus by the features that at least one field bus communication unit is provided, which, in the case of a query from the control unit, communicates at least the measured value, and that at least one output/control unit is provided, which controls the measuring point in time ($t_M$) of the field device, wherein the field bus communication unit transmits at least the communication point in time ($t_K$) to the output/control unit. The apparatus thus includes a field bus communication unit—e.g. an ASIC—, which accepts queries from the field bus and determines whether the query is directed to the particular field device. The output/control unit, which can be an appropriate microprocessor, receives reports of the communication points in time ($t_K$) and starts with them in approximating the following communication point in time ($t_f$). With that, the measuring point in time ($t_M$) is then determined and the measuring suitably initiated.

BRIEF DESCRIPTION OF THE DRAWINGS

The invention will now be explained in greater detail on the basis of the drawings, the figures of which show as follows:
FIG. 2 a block diagram of the apparatus.

DESCRIPTION OF THE PREFERRED EMBODIMENTS

Figure 1:
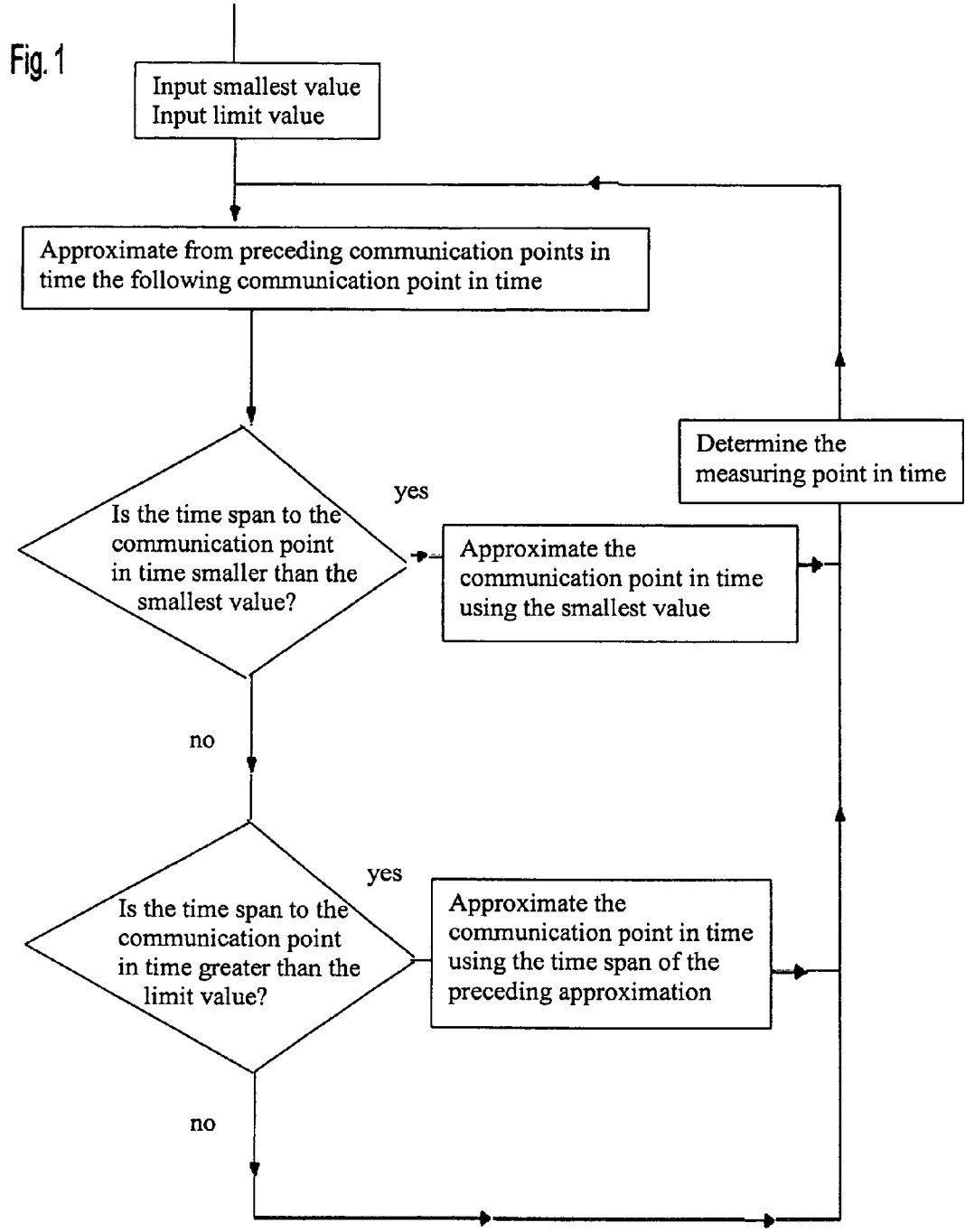
FIG. 1 a flow diagram for the method.

FIG. 1 shows schematically how the method of the invention works. The smallest value K is derived from the technical constraints. It gives the minimum time span that can lie between two measurings, as dictated by the technical situation.

The limit value G gives the boundary between a spacing between communication points in time in a normal communication cycle and a spacing in a communication cycle disturbed e.g. by a parametering. The lengths of these two spacings are sufficiently different that the limit value G can be determined e.g. by a statistical evaluation of a multiplicity of communication points in time. These two comparison values K and G are to be specified before the beginning of the actual process. Then, from previous communication points in time, in each case the following communication point in time is approximated. In such case, e.g. the spacing between plural points in time can be determined and appropriately averaged. Starting from the preceding, last communication point in time, an approximation is then obtained for the following point in time. If the spacing to the next communication point in time is smaller than the smallest value K, then the queries from the central control unit are occurring faster than the process variables of the medium, e.g. the fill level, can be measured.

Therefore, the following communication point in time $t_f$ is calculated from this smallest value K, e.g. by adding the smallest value to the last communication point in time $t_K$. If the time span is smaller than the limit value G, then only a normal query took place and an undisturbed communication cycle is involved. If the time span is greater, then a disturbance has taken place e.g. in the form of a parametering event. Direct consequence of the delay is that the field device would have to communicate a "stale" measured value. Since it is not to be expected that an event would take place right away again, it makes more sense to approximate the next communication point in time $t_f$, for example, using the data of the preceding approximation, e.g. by using the same time span. Following the approximation of the communication point in time $t_f$, the optimum measuring point in time $t_M$ is determined, which should lie as shortly as possible before the communication point in time $t_f$, in order to avoid that the measured value is "stale". At the same time, the measuring point in time $t_M$ should also be so chosen that the measured value can be communicated as immediately as possible upon the query, in order not to produce any delays. This determining of the measuring point in time $t_M$ depends, therefore, very strongly on the intrinsic properties of the measuring device. If this measuring point in time $t_M$ is reached, then the measured value is produced, and, after the query from the field bus, communicated.

FIG. 2 shows a block diagram of the apparatus, with a field bus 5, to which are connected, in this example, three field devices 1 (for example, fill level measuring devices), a central control unit 10 (for example a programmable logic controller, PLC) and a parametering unit 25 (for example, a computer). The field devices have a field bus communication unit 15 (e.g. an ASIC) and an output/control unit 20 (for example, an appropriate microprocessor). Via the parametering unit 25, for example, parameters can be changed in the field devices 1. The output/control unit 20 is so constructed, that it fixes the point in time of the measurement on the basis of the preceding communication points in time, of which it receives knowledge from the field bus communication unit 15.

The invention claimed is:

1. A method for determining a measuring point in time ($t_M$), at which a measured value is to be produced by a field device of process automation technology, comprising the steps of:
   communicating measured values of the field device at certain communication points in time ($t_K$) via a field bus following a query from a central control unit for measured values of the field device;
   approximately determining a following communication point in time ($t_f$) from at least one time span (A) between two preceding communication points in time ($t_k, t'_k$) and a preceding communication point in time ($t''_k$), which is either one of said two preceding communication points in time ($t_k, t'_k$) or which is another communication point in time; and
   determining the measuring point in time ($t_M$) on the basis of said approximately determined following communication point in time ($t_f$); wherein:
   the measuring point in time ($t_M$) should, in such case, be before the approximately determined following communication point in time ($t_f$) and, consequently, before a reporting of the measured value such that said determined measuring point in time ($t_M$) lies before said approximately determined following communication point in time ($t_f$).

2. The method as claimed in claim 1, wherein:
   the measurement point in time ($t_M$) is also communicated with the measured value.

3. The method as claimed in claim 1, further comprising the step of:
   calculating at least two time spans ($A_1, A_2$) between, in each case, at least two preceding communication points in time ($t_{K1}, t'_{K1}, t_{K2}, t'_{K2}$);
   forming an average value (M) from the time spans ($A_1, A_2$); and
   approximately determining the following communication point in time ($t_f$) starting from the average value (M) and a preceding communication point in time ($t''_K$).

4. A field device for determining a measured point in time ($t_M$), comprising:
   a control unit;
   at least one field bus communication unit, which, in the case of a query from said control unit, communicates at least one measured value; and
   at least one output/control unit, which controls the measuring point in time ($t_M$) of said field device, wherein:
   said at least one field bus communication unit transmits the communication point in time ($t_K$) to said output/control unit;
   said output/control unit approximately determines a following communication point in time ($t_f$) from at least one time span (A) between two preceding communication points in time ($t_K, t'_K$) and a preceding communication point in time ($t''_K$) which is either one of said two preceding points in time ($t_K, t'$) or which is another communication point in time; and
   said output/control unit determines the measuring point in time ($t_M$) on the basis of said approximately determined following communication point in time ($t_f$) such that said determined measuring point in time ($t_M$) lies before the approximately determined following communication point in time ($t_f$).

* * * * *